United States Patent [19]
Speer et al.

[11] 3,913,437
[45] Oct. 21, 1975

[54] LOWER GUARD ASSEMBLY FOR POWER SAW

[75] Inventors: Howard David Speer, Sykesville, Md.; Burton Elwood Gerke, Jr., Stewartstown, Pa.

[73] Assignee: The Black and Decker Manufacturing Company, Towson, Md.

[22] Filed: Feb. 11, 1974

[21] Appl. No.: 441,405

[52] U.S. Cl. .................................. 83/478; 83/397
[51] Int. Cl.² .......................................... B26D 7/22
[58] Field of Search .............. 83/478, 397, 544, 546

[56] References Cited
UNITED STATES PATENTS

| | | | |
|---|---|---|---|
| 2,589,309 | 3/1952 | Tompkins | 83/478 |
| 2,669,264 | 2/1954 | Wilson | 83/478 |

*Primary Examiner*—J. M. Meister
*Attorney, Agent, or Firm*—Edward D. Murphy; Joseph R. Slotnik; Leonard Bloom

[57] ABSTRACT

A lower saw guard assembly for a radial arm power saw is provided. The guard assembly includes a pair of pivotable guard plates substantially in the shape of quadrants which overlap at the front of the saw blade to provide a substantially semi-circular front saw guard and a pair of pivotable guard links which overlap adjacent to the back of the saw blade to provide a substantially semi-circular rear guard for the blade. The front guard plates and rear guard links are simultaneously pivotable upon engagement with work material to expose necessary areas of the periphery of the saw blade to cut the work material. The front guard plates and rear guard links are designed to achieve desired safety and eliminate the possibility of jamming of the lower guard assembly against the work material to minimize the possibility of interference with movement of the saw.

10 Claims, 10 Drawing Figures

LOWER GUARD ASSEMBLY FOR POWER SAW

The present invention relates to a saw guard assembly for a power saw and, more particularly, to a lower saw guard assembly for a radial arm saw which provides an effective safeguard against accidental injury to an operator, presents minimum resistance to movement of the saw relative to work material, and avoids the possibility of jamming of the saw guard against the work material.

In the construction of a power saw including a rotary saw blade, e.g., a radial arm saw, it has been customary to provide a saw blade housing for covering the upper portion of the rotary saw blade. The lower portion of the saw blade is either fully exposed or is protected by a retractable guard since this part of the blade engages and cuts work material. In order for saws using retractable lower guards to perform satisfactorily, it is necessary that these guards properly retract for all normal cutting operations.

It has been proposed in the prior art to use lower saw guards attached to the upper saw blade housing to guard the lower periphery of the saw blade. The lower saw guards have usually included arcuately shaped guard members pivotally connected to the upper saw blade housing and normally held downward in a guard position adjacent the lower periphery of the saw blade. Upon engagement with the work material, these guard members retract upwardly to expose the lower part of the saw blade as it cuts through the work material. As the saw passes the work material, the guard members return to their guard position.

Some lower saw guards of the prior art have been unsatisfactory because of undue interference with manual movement of the saw relative to the work material. These lower saw guards have increased the amount of effort required by an operator to move the saw relative to the work material. In addition, the saw guards of the prior art are sometimes susceptible to jamming against the work material to render the saw incapable of manual movement by the operator. It has thus been necessary for the operator to use his hands near the saw blade to unjam the saw guard and work material. The necessity for the operator to use his hands near the saw blade to unjam the saw guard has increased his risk of accidental injury. Consequently, it is common practice to leave the lower portion of the radial saw exposed without any protection for the operator against accidental injury in spite of the availability of lower saw guards in the prior art.

Accordingly, it is an object of the present invention to provide a lower saw guard assembly for a radial arm saw which provides effective protection against accidental injury to the operator, presents minimum resistance to movement of the saw relative to work material, and avoids the possibility of jamming against the work material.

It is also an object of the present invention to provide front and rear lower saw guard assemblies for guarding the saw blade of a radial arm saw which present minimal resistance to forward and backward movement of the saw relative to the work material and which virtually eliminate the possibility of jamming of the saw guard assembly against the work material during movement of the saw in either direction.

The present invention provides a lower saw guard assembly for a radial saw which protects an operator against accidental injury by the lower portion of the saw blade. The invention contemplates both front and rear saw guard assemblies located on opposite sides of the saw blade to guard both sides of the blade. Each guard assembly is normally located in a guard position adjacent the lower periphery of the saw blade and is movable to an unguard position by engagement with the work material to expose the lower periphery of the saw blade to the work material. Each saw guard assembly is constructed to provide minimal resistance to movement of the radial saw relative to the work material and to avoid the possibility of jamming of the saw guard assembly against the work material.

The front saw guard assembly of the present invention comprises first and second guard members located adjacent to the saw blade and mounted for pivotal movement about first and second spaced pivot points, respectively, with each guard member having an inner edge and a curved marginal edge. The guard members normally overlap each other along the inner edges with the curved marginal edges adjacent the lower periphery of the saw blade. In accordance with the invention, the front saw guard assembly includes means for slidably connecting the first and second guard members together to permit the guard to pivot simultaneously in opposite directions about the first and second pivot points upon movement of a workpiece into engagement with either curved marginal edge of the guard members. In addition, the front saw guard assembly includes means for slidably connecting the second guard member to the second pivot point to permit the first and second guard members to pivot as a unit about the first pivot point upon engagement of only the inner edge of the second guard member, and not the first guard member, with the workpiece.

In a preferred embodiment of the front saw guard assembly, the guard members comprise first and second guard plates substantially in the shape of quadrants which normally overlap to define a substantially semicircular lower saw guard. A pin and slot connection comprising intersecting arcuate slots formed in the guard plates and a connecting pin slidably received in the arcuate slots is provided to slidably connect the guard plates together. Either the first guard plate, the second guard plate, or both, include an additional arcuate slot for receiving the pivot pins to allow both guard plates to pivot as a unit about the pivot pins.

The rear saw guard assembly of the present invention comprises first and second guard members located adjacent to the saw blade and mounted for pivotal movement about first and second pivot points, respectively. Each guard member includes a free end overlapping the free end of the other guard member and a curved marginal edge normally adjacent the lower periphery of the saw blade. In accordance with the invention, the rear saw guard assembly includes means for slidably connecting the free ends of the first and second guard members together to permit the guard members to pivot simultaneously in opposite directions about the first and second pivot points upon movement of a workpiece into engagement with either curved marginal edge of the guard members. In addition, the rear saw guard assembly includes means on the first guard member for preventing movement of the workpiece into engagement with the free end of the second guard member.

In a preferred embodiment of the rear saw guard assembly, the guard members comprise first and second overlapping guard links mounted for pivotal movement about first and second spaced pivot points, respectively, with each guart link having a curved marginal edge normally encircling the lower periphery of the saw blade. A pin and slot connection comprising an elongated arcuate slot formed adjacent to the free end of the second guard link and a pin mounted on the first guard link adjacent to its free end and slidably received in the elongated arcuate slot is provided for slidably connecting the free ends of the guard links together. In addition, a flange is provided on the first guard link which extends from its curved marginal edge underneath the free end of the second guard link to prevent the free end of the second guard link from engaging the workpiece.

The front and rear saw guard assemblies of the present invention provide necessary protection against accidental injury of the operator by the saw blade. Each saw guard assembly includes pivotal guard members which are easily pivotable upon engagement with the workpiece to raise the saw guard assembly from its guard position to its unguard position to expose the saw blade to cut the workpiece. The saw guard assemblies thus present minimal resistance to movement of the saw relative to the workpiece. In addition, the guard members of each saw guard assembly are specifically constructed to avoid the possibility of jamming against the workpiece and thus eliminate the necessity for the operator to use his hands near the saw blade to unjam either saw guard assembly, and the likelihood that the operator might attempt to remove either guard assembly.

The accompanying drawings illustrate preferred embodiments of the invention and, together with the description, serve to explain the principles of the invention. Of the drawing.

Figure 1:
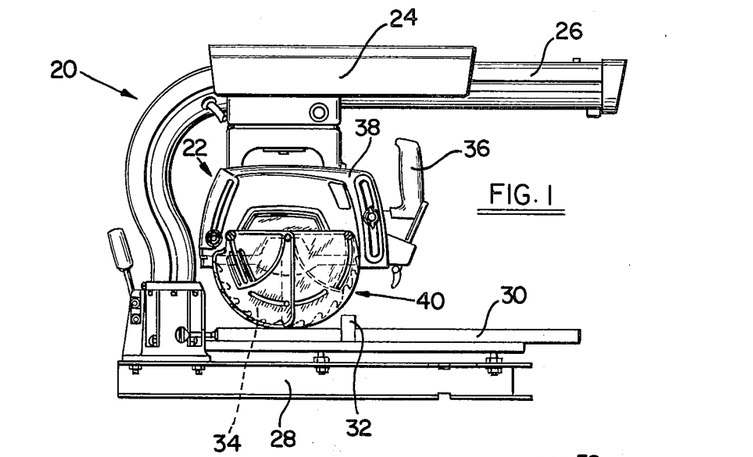
FIG. 1 is a front elevation of a radial arm saw including a saw blade housing which supports a lower saw guard assebly constructed in accordance with the principles of the present invention for guarding the lower periphery of its saw blade.

Referring to FIG. 1, a radial arm saw, generally 20, includes a saw 22 mounted on a slide 24 which, in turn, is slidably mounted on a support arm 26 to support the saw for movement across a work table 28. The work table includes a horizontal work support 30 which consists of either a flat, horizontal plate or a plurality of spaced, horizontal rails. A fence 32 is provided on the work support to enable an operator to firmly hold a workpiece in a fixed position on the work table.

Saw 22 includes a circular saw blade 34 which a driven at high speed by an electric motor (not shown). A handle 36 is provided on saw 22 to enable an operator to manually draw the saw across the work table to cut a workpiece resting on the work support. Support arm 26 is normally adjustable between different angular orientations in a horizontal plane above work table 28 to permit saw 22 to make variable angular cuts through the workpiece.

In addition, saw 22 includes a blade housing 38 forming an upper blade guard within which circular saw blade 34 is mounted for rotation. The upper guard provides a protective cover for the upper portion of saw blade 34. The lower portion of saw blade 34 extends downward beneath the upper guard to expose the lower periphery of the saw blade to cut the workpiece.

Referring to FIG. 1, the present invention is embodied as a front, lower saw guard assembly, generally 40, for protecting an operator against accidental injury by the lower portion of the saw blade. Front saw guard assembly 40 is normally located in a guard position (FIG. 3) adjacent the lower periphery of saw blade 34 and is movable to an unguard position (FIG. 4) by engagement with a workpiece to expose the lower periphery of the saw blade to cut the workpiece. The saw guard assembly 40 is constructed to provide minimal resistance to movement of the radial saw relative to the workpiece and to avoid the possibility of jamming of the saw guard assembly against the workpiece.

The front saw guard assembly 40 comprises a pair of guard members 42 and 44, respectively, in the form of guard plates mounted for pivotal movement about fixed pivot pins 46 and 48, respectively, on the front of saw blade housing 38. The guard plates are preferably made of lightweight, transparent material, e.g., clear or tinted plastic, to allow an operator to observe the saw blade and workpiece during operation of the radial saw. Pivot pins 46 and 48 are located on opposite sides of the axis of rotation of saw blade 34.

In the preferred embodiment, guard plates 42 and 44 are substantially in the shape of quadrants having straight horizontal top edges 50 and 52, straight vertical inner edges 54 and 56, and curved marginal edges 58 and 60, respectively. Horizontal edge 50 and vertical edge 54 intersect at right angles to define a vertex of guard plate 42. A handle 62 is located at the vertex of guard plate 42 to enable an operator to manually operate the front guard assembly. In addition, curved marginal edge 58 extends upwardly toward horizontal edge 50 to define an upper corner of guard plate 42 and extends downwardly toward vertical edge 54 to define a lower corner of the guard plate. A portion of the upper corner of guard plate 42 is cutaway to accommodate the external configuration of the saw blade housing. An opening provided in guard plate 42 adjacent to its cutaway upper corner for receiving pivot pin 46 to support the guard plate for pivotal movement. Similarly, horizontal edge 52 and vertical edge 56 intersect at right angles to define a vertex of guard plate 44. Curved marginal edge 60 extends upwardly toward horizontal edge 52 to define an upper corner of guard plate 44 and downwardly toward vertical edge 56 to define a lower corner of the guard plate.

Figure 3:
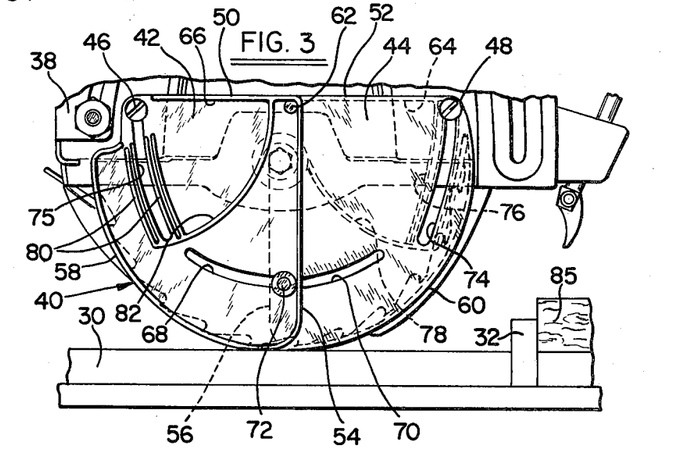
FIG. 3 is an enlarged front elevation illustrating the front saw guard assembly in its normal position or configuration to guard the lower periphery of the saw blade.
Figure 4:
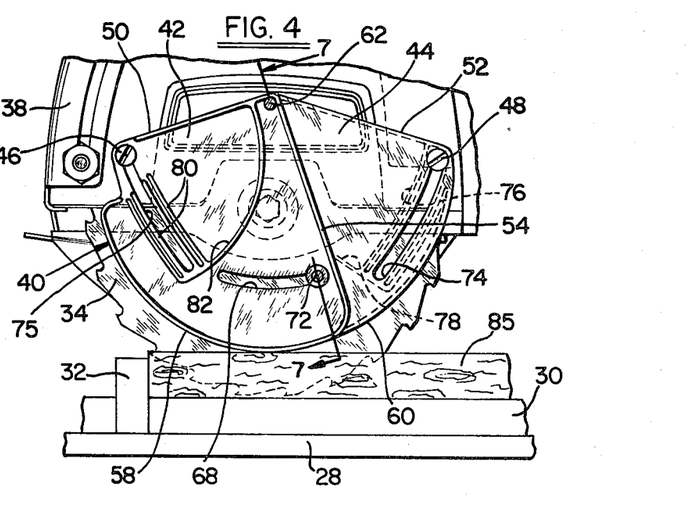
FIG. 4 illustrates the front saw guard assembly of FIG. 3 moved to its unguard configuration by engagement of a workpiece with the saw guard assembly to expose the lower periphery of the saw blade to cut the workpiece.
Figure 7:
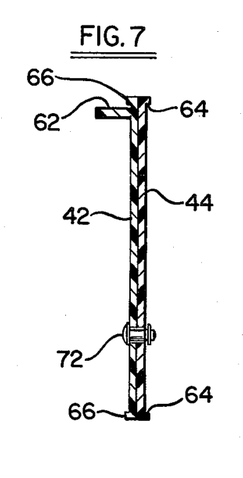
FIG. 7 is a section view of the front saw guard assembly taken along lines 7—7 of FIG. 4.

As shown in FIG. 3, guard plates 42 and 44 normally overlap each other along inner, vertical edges 54 and 56 to provide a common, overlap area between the vertical edges of the guard plates. The rear surface of guard plate 44 which faces saw blade 34 includes a peripheral rib 64 to enhance the stiffness of the guard plate to provide increased resistance to bending. As shown in FIG. 7, the front surface of guard plate 44 is substantially planar. Similarly, the rear surface of guard plate 42 which faces saw blade 34 and overlaps the front surface of guard plate 44 is substantially planar to present minimal resistance to simultaneous pivotal movement of the guard plates about pivot pins 46 and 48. The front surface of guard plate 42 includes a peripheral rib 66 to enhance the stiffness of the guard plate to provide increased resistance to bending.

In accordance with the invention, the front, lower saw guard assembly includes means for slidably connecting the first and second guard members together to permit the guard members to pivot simultaneously in opposite directions about the first and second pivot pins upon movement of a workpiece into engagement with either curved marginal edge of the guard members. Preferably, this means is embodied as a pin and slot connection for slidably connecting the overlap area of the guard plates together.

As shown in FIG. 3, the pin and slot connection of front saw guard assembly 40 comprises elongated arcuate slots 68 and 70 formed in guard plates 42 and 44, respectively, which intersect at a common point in the overlap area of the guard plates in combination with a connecting pin 72 slidably received in the elongated arcuate slots to connect the guard plates together. Elongated arcuate slot 68 extends tangentially from a point slightly above the lower corner of guard plate 42 and adjacent to its vertical edge 54 toward horizontal edge 50 of the guard plate. The center of radius of arcuate slot 68 is located approximately at the vertex of guard plate 42. Similarly, elongated arcuate slot 70 extends tangentially from a point slightly above the lower corner of guard plate 44 and adjacent to its vertical edge 56 toward horizontal edge 52 of the guard plate. The center of radius of arcuate slot 70 is located approximately at the vertex of guard plate 44.

Further, in accordance with the invention, the front, lower saw guard assembly includes means for slidably connecting both guard members to the pivots to permit the first and second guard members to pivot as a unit about either pivot point upon movement of the workpiece into engagement with the vertical edge of either guard member. Preferably, this means is embodied as an additional arcuate slot in the first and second guard plates extending in an arcuate path from the upper corner of that guard plate toward its vertical edge.

As shown in FIG. 3, guard plate 44 includes an elongated arcuate slot 74 extending from a point adjacent to the upper corner of the guard plate toward its vertical edge 56. The center of radius of elongated arcuate slot 74 coincides substantially with the axis of first pivot pin 46. Second pivot pin 48 is slidably received in elongated arcuate slot 74. Normally, as shown in FIG. 3, pivot pin 48 is located at the upper end of elongated slot 74 to support guard plate 44 for pivotal movement about the pivot pin. However, as explained below, elongated arcuate slot 74 also permits slidable movement of guard plate 44 relative to pivot pin 48 if necessary to avoid jamming of the guard against the workpiece.

Similarly, guard plate 42 includes an elongated arcuate slot 75 slidably receiving the pivot pin 46. Normally, pivot pin 46 is located at the upper end of slot 75. However, guard plate 42 can slide relative to pivot pin 46 to avoid jamming of the guard plate as will be described.

Referring to FIG. 3, a set of ribs 76 is integrally formed on the rear surface of guard plate 44 around elongated arcuate slot 74 to reinforce the guard plate in the vicinity of the slot. In addition, a curved rib 78 also on the rear surface of guard plate 44 joins ribs 76 at the lower end of elongated slot 74 and extends in an arcuate path to horizontal edge 52 adjacent to the vertex of the guard plate. Curved rib 78 serves as both a reinforcing rib and as a support surface to slide on the blade housing 38. Similarly, a set of ribs 80 is integrally formed on the front surface of guard plate 42 to substantially match ribs 76 on the rear surface of guard plate 44. In addition, a curved rib 82 also on the front surface of guard plate 42, joins the lower ends of ribs 80 and extends in an arcuate path to horizontal edge 50 adjacent to the vertex of the guard plate. Ribs 80 and 82 serve to strengthen the resistance of guard plate 42 to bending and as ornamentation.

In the normal operation of radial saw machine 20, a workpiece 85 (FIG. 4) is placed on work support 30 in abutment with fence 32. The workpiece can be held in place by one or more clamps (not shown) or by an operator firmly holding the workpiece on work support 30 against fence 32. Support arm 26 is adjusted to a desired angular orientation in its horizontal plane. The operator then actuates saw 22 by operating a control switch (not shown) and grips handle 36 to draw the radial saw rightward, as viewed in FIG. 1, to make a desired cut through workpiece 85.

Referring to FIG. 3, front saw guard assembly 40 is normally maintained by gravity in a guard position to protect the lower periphery of saw blade 34. Guard plates 42 and 44 are located in normal, downward positions with connecting pin 72 located at the lower ends of elongated arcuate slots 68 and 70 to allow the guard plates to overlap along vertical edges 54 and 56 with marginal curved edges 58 and 60 adjacent the lower periphery of the saw blade.

As the radial saw is drawn rightward toward workpiece 85, curved marginal edge 60 of guard plate 44 makes initial contact with the workpiece. The forces exerted on guard plate 44 by the workpiece tend to pivot the second guard plate in a clockwise direction about pivot pin 48. These forces are transmitted to guard plate 42 through connecting pin 72 and tend to pivot the first guard plate in a counterclockwise direction about pivot pin 46. Thus, upon further rightward movement of the radial saw relative to workpiece 85, guard plates 42 and 44 pivot simultaneously in opposite directions about pivot pins 46 and 48, respectively, to raise front saw guard assembly 40 to an unguard position (FIG. 4) to expose the lower periphery of saw blade 34 to cut the workpiece. With front saw guard assembly 40 in its unguard position, connecting pin 72 is moved to an intermediate position in elongated arcuate slots 68 and 70.

After saw blade 34 cuts completely through workpiece 85, i.e., with saw 22 moved to its outermost position on support arm 26, front guard assembly 40 returns downward to its guard position (FIG. 4) with curved marginal edges 58 and 60 of the guard plates adjacent the lower periphery of the saw blade. The operator then moves radial saw 22 to its original position by pushing on handle 36 to move the radial saw leftward, as viewed in FIG. 1, to its innermost position on support arm 26. In the event that the saw guard assembly encounters any obstacle during return movement of radial saw 22 to its original position, front saw guard assembly 40 is capable of two different types of pivotal action to allow the radial saw to move freely past the obstacle back to its original position.

If, for example, the cut end of workpiece 85 is located in the return path of movement of guard plate 42, the pivotal action of the saw guard assembly is substantially the same as the action described above during initial movement of the radial saw to cut the workpiece. Curved marginal edge 58 of guard plate 42 makes initial contact with the cut end of the workpiece. The forces exerted on guard plate 42 tend to pivot the first guard plate in a counterclockwise direction about pivot pin 46. These forces are also transmitted to guard plate 44 through connecting pin 72 and tend to pivot the second guard plate in a clockwise direction about pivot pin 48. Thus, both guard plates pivot simultaneously in opposite directions to raise the front saw guard assembly to its unguard position (FIG. 4) to permit the saw guard assembly to pass over the cut end of the workpiece.

If, on the other hand, only a small cut portion of the workpiece remains between saw blade 34 and front saw guard assembly 40, a different type of pivotal action is available to allow the saw guard assembly to pass over the cut portion of the workpiece during return movement of the radial saw to its original position. If the cut portion of the workpiece is sufficiently close to saw guard assembly 40, inner vertical edge 56 of guard plate 44 engages the cut portion of the workpiece during return movement of the radial saw toward its original position. The cut portion of the workpiece exerts forces on guard plate 44 which, in turn, are transmitted to guard plate 42 through connecting pin 72. These forces tend to pivot both guard plates as a unit about pivot pin 46 to allow front saw guard assembly 40 to pass over the cut portion of the workpiece during the return movement of the radial saw.

When radial saw 22 returns to its original position, front saw guard assembly 40 returns downward to its guard position (FIG. 3) with curved marginal edges 58 and 60 of the guard plates encircling the lower periphery of saw blade 34. Handle 62 on guard plate 42 permits the operator to raise front saw guard assembly 40 manually, if necessary, to clear away the cut portion of the workpiece or to clear the saw blade.

In using the saw for bevel, or compound bevel-miter cutting, it may occur that vertical edge 54 of guard plate 42 engages the workpiece before the guard plate 42 has been raised sufficiently to clear the workpiece. In that situation, guard plates 42, 44 pivot conjointly about pivot pin 48 (by pivot pin 46 sliding in slot 75) so that both guard plates 42, 44 can clear the workpiece.

Figure 5:
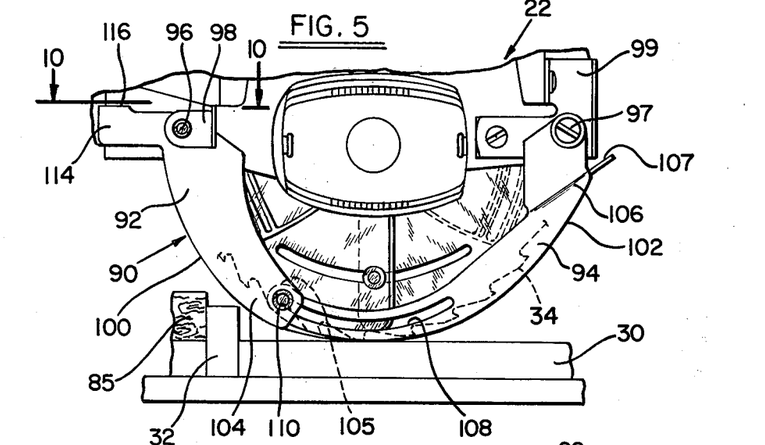
FIG. 5 is an enlarged rear elevation illustrating the rear saw guard assembly in its normal configuration to guard the lower periphery of the saw blade.

Referring to FIG. 5, the present invention is also embodied as a rear, lower saw guard assembly, generally 90, for guarding the rear of saw blade 34. The rear saw guard assembly includes a pair of guard members 92 and 94, respectively, in the form of guard links mounted for pivotal movement about first and second pivot pins 96 and 97, respectively. Pivot pins 96 and 97 are supported by corresponding brackets 98 and 99 mounted on the rear of saw blade housing 38 and are located on opposite sides of the axis of rotation of saw blade 34.

Figure 8:
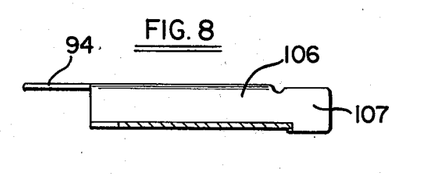
FIG. 8 is a section view of the rear saw guard assembly taken along lines 8—8 of FIG. 6.

Preferably, guard links 92 and 94 are substantially arcuate in shape and provided with curved marginal edges 100 and 102, respectively, which normally encircle the lower periphery of saw blade 34. Guard link 92 includes a lower, free end 104 which overlaps a lower, free end 105 of guard link 94. The opposite ends of guard links 92 and 94 are provided with openings for receiving pivot pins 96 and 97. Guard link 94 includes an offset 106 located adjacent to pivot pin 97 which allows its free end 105 to overlap free end 104 of guard link 92 on its inner surface which faces saw blade 34. As shown in FIG. 8, a flange 107 projects rearwardly, from offset 106 of the second guard link, for manual operation of these guards. The guard links of the preferred embodiment are made of metal.

In accordance with the invention, the rear, lower saw guard assembly includes means for slidably connecting the free ends of the first and second guard members together to permit the guard members to pivot simultaneously in opposite directions about first and second pivot points upon movement of a workpiece into engagement with either curved marginal edge of the guard members. Preferably, this means is embodied as a pin and slot connection for slidably connecting the lower, free ends of the guard links together.

As shown in FIG. 5, the pin and slot connection of rear saw guard assembly 90 comprises an elongated arcuate slot 108 formed in guard link 94 and extending in an arcuate path from a point adjacent to its lower, free end 105 toward pivot pin 97 in combination with a connecting pin 110 mounted on guard link 92 adjacent to its lower, free end 104. The connecting pin is slidably received in elongated slot 108 to connect the free ends of the guard links together.

As shown in FIG. 5, the pin and slot connection of rear saw guard assembly 90 comprises an elongated arcuate slot 108 formed in guard link 94 and extending in an arcuate path from a point adjacent to its lower, free end 105 toward pivot pin 97 in combination with a connecting pin 110 mounted on guard link 92 adjacent to its lower, free end 104. The connecting pin is slidably received in elongated slot 108 to connect the free ends of the guard links together.

Figure 6:
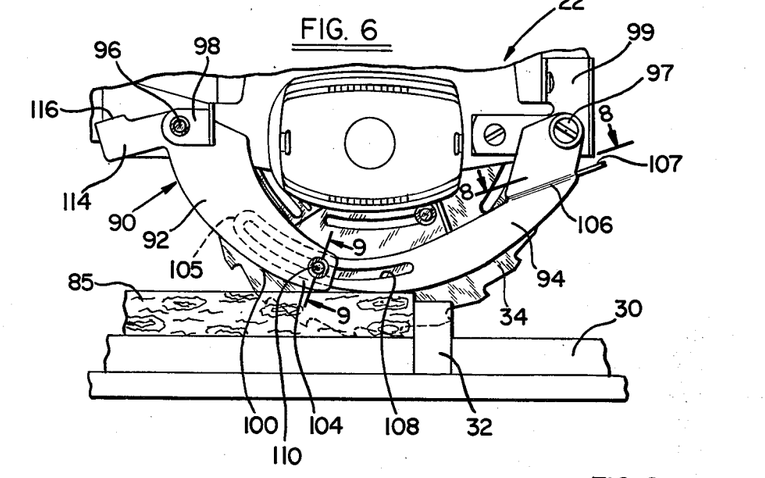
FIG. 6 illustrates the rear saw guard assembly of FIG. 5 raised to its unguard configuration by engagement with a workpiece to expose the lower periphery of the saw blade to cut the workpiece.

As shown in FIG. 5, the free ends of guard links 92 and 94 are normally held downward by gravity to maintain the rear saw guard assembly in a guard position with marginal edges 100 and 102 of the guard links encircling the lower periphery of saw blade 34. With the rear saw guard assembly in its guard position, pin 110 is located at the lefthand end of elongated slot 108. When, as shown in FIG. 6, a workpiece is moved into engagement with either curved marginal edge of guard links 92 and 94, the pin and slot connection causes the guard links to pivot simultaneously in opposite directions to move the rear saw guard assembly upward to an unguard position to expose the lower periphery of saw blade 34 to cut the workpiece. Elongated slot 108 allows free end 105 of guard link 94 to slide relative to free end 104 of guard link 92 to move connecting pin 110 to an intermediate position within the elongated slot.

Further, in accordance with the invention, the rear saw guard assembly includes means on the first guard member for preventing movement of the workpiece into engagement with the free end of the second guard member. Preferably, this means is embodied as a flange on the first guard link extending from its curved marginal edge underneath the free end of the second guard link.

Figure 2:
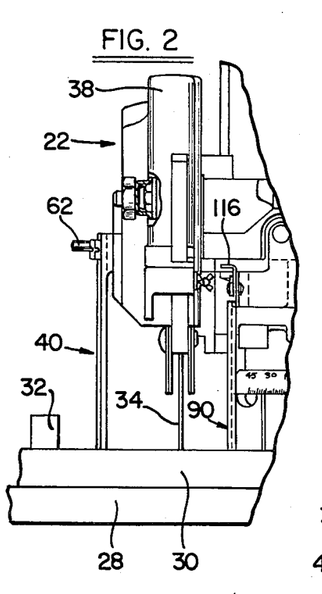
FIG. 2 is an enlarged side view of a portion of the radial saw illustrating a front saw guard assembly and a rear saw guard assembly provided on the saw blade housing.
Figure 9:
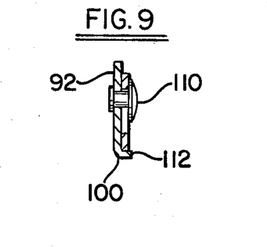
FIG. 9 is a section view of the rear saw guard assembly taken along lines 9—9 of FIG. 6.
Figure 10:
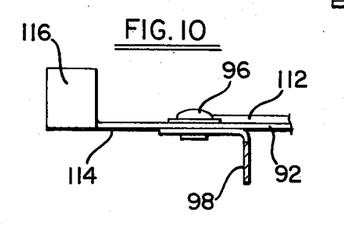
FIG. 10 is a top view of a portion of the rear saw guard assembly taken along lines 10—10 of FIG. 5.

The preferred embodiment of FIG. 5 includes a flange 112 on guard link 92 extending perpendicularly from its curved marginal edge 100 toward saw blade 32. The flange extends for substantially the entire length of curved marginal edge 100 of the first guard link. As in FIG. 9, flange 112 extends laterally from curved marginal edge 100 of guard link 92 underneath free end 105 of guard link 94. The purpose of the flange is to prevent free end 105 of guard link 94 from jamming against workpiece 85 during movement of the radial saw In addition, an arm 114 projects forwardly from guard link 92 adjacent to pivot pin 96. A flange 116 (FIG. 2) extends perpendicularly from arm 114 toward saw blade housing 38 to permit manual operation of rear guard assembly 90. Flange 116 enables an operator to raise the rear saw guard manually, if necessary, to its unguard position by depressing the flange with his finger.

When saw 22 is actuated and draw along its support arm to cut through workpiece 85 (FIG. 5), curved marginal edge 100 of guard link 92 initially engages a portion of the workpiece located in the path of movement of rear saw guard assembly 90.

The forces exerted on guard link 92 by the workpiece tend to pivot the first guard link in a counterclockwise direction about pivot 96. These forces are transmitted to guard link 94 through connecting pin 110 and tend to pivot the guard link about pivot pin 98 in a clockwise direction. Thus, upon further movement of the radial saw across the workpiece, guard links 92 and 94 pivot simultaneously in opposite directions about pivot pins 96 and 98, respectively, to raise the rear saw guard assembly to an unguard position (FIG. 6) to expose the lower periphery of saw blade 34 to cut the workpiece. With rear saw guard assembly in its unguard position, connecting pin 110 is moved to an intermediate position in elongated arcuate slot 108. After saw blade 34 cuts completely through the workpiece, i.e., with radial saw 22 moved to its outermost position on support arm 26, rear saw guard assembly 90 returns downward to its guard position (FIG. 5) with curved marginal edges 100 and 102 of the guard links encircling the lower periphery of saw blade 34.

When radial arm saw 22 is moved backward along support arm 26 to its original position, curved marginal edge 102 of guard link 94 initially engages the cut portion of workpiece 85 located in the path of movement of the rear saw guard assembly. The forces exerted on guard link 94 are transmitted to guard link 92 through connecting pin 110 to pivot both guard links simultaneously in opposite directions to raise rear saw guard assembly 90 to its unguard position to permit the saw guard assembly to pass over the cut portion of the workpiece. Thereafter, upon return of the radial saw to its original position, guard links 92 and 94 pivot downward to move rear saw guard assembly 90 downward to its guard position with curved marginal edges 100 and 102 of the guard links encircling the lower periphery of saw blade 34.

If, for example, it is desired to cut only a relatively short end portion from workpiece 85, e.g., a portion approximately equal in width to the distance between saw blade 32 and rear saw guard assembly 90, the end of the workpiece to be cut may extend to a position closely adjacent the path of movement of guard link 94. It is thus necessary to avoid the possibility of engagement of free end 105 of guard link 94 with the end of workpiece 85 to avoid jamming of the rear saw guard assembly against the workpiece. Flange 112 on guard link 92 serves as a safeguard against such jamming. The flange extends underneath free end 105 of guard link 94 and thus precludes any possibility of engagement between the free end of the guard link and the workpiece during movement of the radial saw.

The present invention thus provides a lower saw guard assembly for a radial saw which protects the operator against accidental injury by precluding movement of his hands into contact with either the front or the rear of the saw blade. The guard plates of the front saw guard assembly and the guard links of the rear saw guard assembly are easily pivotable upon engagement with a workpiece to expose the lower periphery of the saw blade to cut the workpiece. In addition, the front guard plates and rear guard links are designed to avoid the possibility of jamming against the workpiece or a cut portion of the workpiece to eliminate the need for an operator to place his hands near the saw blade to remove any obstacles to movement of the radial saw. This anti-jamming feature enhances the protection provided by the lower guard assembly against accidental injury to the operator.

The invention in its broader aspects is not limited to the specific details shown and described, and modifications may be made in the details of the lower saw guard assembly without departing from the principles of the present invention.

What is claimed is:

1. A lower guard assembly for a power saw including a rotary saw blade, comprising:

first and second guard members located adjacent to the saw blade and mounted for pivotal movement about first and second spaced pivot points, respectively, each guard member having an inner edge and a curved marginal edge;

said guard members normally overlapping each other along said inner edges with said curved marginal edges adjacent the lower periphery of the saw blade;

means for slidably connecting said first and second guard members together to permit said guard members to pivot simultaneously in opposite directions about said first and second pivot points upon movement of a workpiece into engagement with either curved marginal edge of said guard members; and means for slidably connecting said second guard member to said second pivot point to permit said first and second guard members to pivot as a unit about said first pivot point upon movement of a workpiece into engagement with said inner edge of said second guard member.

2. A lower guard assembly for a power saw including a rotary saw blade, comprising:

first and second guard plates each having a straight horizontal edge, a straight vertical edge, and a curved marginal edge;

said first plates normally overlapping each other along said vertical edges to provide an overlap area and to establish a substantially semi-circular lower saw guard with said curved marginal edges of said guard plates encircling the lower periphery of the saw blade;

said first guard plate being mounted for pivotal movement about a first pivot point located adjacent to its horizontal edge and its curved marginal edge;

said second guard plate being mounted for pivotal movement about a second pivot point located adjacent to its horizontal edge and its curved marginal edge;

means for slidably connecting said first and second guard plates to permit said guard plates to pivot simultaneously in opposite directions about said first and second pivot points upon movement of a workpiece into engagement with either curved marginal edge of said guard plates; and means for slidably connecting said second guard plate to said second pivot point to permit said first and second guard plates to pivot as a unit about said first pivot point upon movement of the workpiece into engagement with said vertical edge of said second guard plate.

3. A lower saw guard assembly for a radial saw including a rotary saw blade, comprising:

first and second guard plates substantially in the shape of quadrants, each guard plate having a straight horizontal edge, a straight vertical edge, and an arcuate outer edge;

said guard plates normally overlapping each other along said vertical edges to provide an overlap area and to establish a substantially semi-circular lower guard for the radial saw with said arcuate edges of said guard plates encircling the lower periphery of the saw blade;

said first guard plate being mounted for pivotal movement about a first pivot point located adjacent to its horizontal edge and its arcuate edge;

said second guard plate being mounted for pivotal movement about a second pivot located adjacent to its horizontal edge and its arcuate edge;

a pin and slot connection for slidably connecting said guard plates together to permit said guard plates to pivot simultaneously in opposite directions about said first and second pivot points upon movement of a workpiece into engagement with either arcuate edge of said guard plates; and said second guard plate including an elongated arcuate slot extending from said second pivot point toward its vertical edge to permit said first and second guard plates to pivot as a unit about said first pivot point upon movement of the workpiece into engagement with said vertical edge of said second guard plate.

4. A lower saw guard assembly for a radial saw including a rotary saw blade, comprising:

first and second guard plates substantially in the shape of quadrants, each guard plate having a straight horizontal edge, a straight vertical edge, and an arcuate outer edge;

said guard plates normally overlapping each other along said vertical edges to provide an overlap area and to establish a substantially semi-circular lower guard for the radial saw with said arcuate edges of said guard plates encircling the lower periphery of the saw blade;

said first guard plate being mounted for pivotal movement about a first pivot point located adjacent to its horizontal edge and its arcuate edge;

said second guard being mounted for pivotal movement about a second pivot point located adjacent to its horizontal edge and its arcuate edge;

each of said guard plates including an elongated arcuate slot extending from a common point located in said overlap area toward its horizontal edge;

a connecting pin slidably received in said elongated arcuate slots of said guard plates to connect said guard plates together and to permit said guard plates to pivot simultaneously in opposite directions about said first and second pivot points upon movement of a workpiece into engagement with either arcuate edge of said guard plates; and said second guard plate including an additional elongated arcuate slot extending from said second pivot point toward its vertical edge to permit said first and second guard plates to pivot as a unit about said first pivot point upon movement of the workpiece into engagement with said vertical edge of said second guard plate.

5. A lower saw guard assembly for a radial saw including a rotary saw blade, comprising:

first and second guard plates substantially in the shape of quadrants, each guard plate having a straight horizontal edge and a straight vertical edge which define a vertex and a circular outer edge which defines corners with said horizontal and vertical edges;

said guard plates normally overlapping each other along said vertical edges to establish a semi-circular lower guard for the radial saw with said circular edges of said guard plates encircling the lower periphery of the saw blade;

said first guard plate being mounted for pivotal movement about a first pivot point located adjacent to the corner of said first guard plate defined by its horizontal edge and its circular edge;

said second guard plate being mounted for pivotal movement about a second pivot point located adjacent to the corner of said second guard plate defined by its horizontal edge and its circular edge;

said guard plates including overlapping elongated slots extending tangentially in opposite directions from a common position adjacent to said respective vertical edges of said guard plates toward said respective horizontal edges of said guard plates;

a connecting pin slidably received in said tangential slots of said guard plates to connect said guard plates together and to permit said guard plates to pivot in opposite directions about said first and second pivot points upon movement of a workpiece into engagement with either of said circular edges of said guard plates; and said second guard plates including an additional elongated slot extending tangentially from said second pivot point toward its vertical edge to permit said first and second guard plates to pivot as a unit about said first pivot point upon movement of the workpiece into engagement with said vertical edge of said second guard plate.

6. The lower saw guard assembly of claim 5, wherein: said first guard plate includes a handle projecting perpendicularly from its vertex to permit pivotal movement of said first and second guard plates by manual engagement of said handle.

7. A lower saw guard assembly for a radial saw including a rotary saw blade, comprising:
  a first guard plate substantially in the shape of a quadrant having a straight horizontal edge and a straight vertical edge which define a vertex and a circular outer edge which defines upper and lower corners of said guard plate with said horizontal and vertical edges, respectively;
  a second guard plate substantially in the shape of a quadrant having a straight horizontal edge and a straight vertical edge which define a vertex and a circular outer edge which defines upper and lower corners of said guard plate with said horizontal and vertical edges, respectively;
  said guard plates normally overlapping each other along said vertical edges to establish a substantially semi-circular lower guard for the radial saw with said circular edges of said guard plates encircling the lower periphery of the saw blade;
  said first guard plate including an elongated arcuate slot extending tangentially relative to said vertex of said first guard plate from a point adjacent to its lower corner toward its horizontal edge;
  said second guard plate including an elongated arcuate slot in alignment with said elongated arcuate slot of said first guard plate and extending tangentially relative to said vertex of said second guard plate from a point adjacent to its lower corner toward its horizontal edge;
  a connecting pin slidably received in said elongated arcuate slots of said guard plates to connect said guard plates together;
  said first guard plate including an opening located adjacent to its upper corner for receiving a first pivot pin to support said guard plate for pivotal movement about said first pivot pin; and
  said second guard plate including an additional elongated arcuate slot extending tangentially relative to said first pivot pin from a point adjacent to said upper corner of said second guard plate toward its vertical edge for receiving a second pivot pin to support said second guard plate for pivotal movement about said second pivot pin and to permit said first and second guard plates to pivot as a unit about said first pivot pin.

8. The saw guard of claim 7, wherein: said first guard plate includes a handle projecting perpendicularly from its vertex to permit simultaneous pivotal movement of said first and second guard plates by manual engagement of said handle.

9. A lower guard assembly for a power saw including a rotary saw blade, comprising:
  first and second guard members located adjacent to the saw blade and mounted for pivotal movement about first and second spaced pivot points, respectively, each guard member having an inner edge and a curved marginal edge;
  said guard members normally overlapping each other along said inner edges with said curved marginal edges adjacent the lower periphery of the saw blade;
  means for slidably connecting said first and second guard members together to permit said guard members to pivot simultaneously in opposite directions about said first and second pivot points upon movement of a workpiece into engagement with either curved marginal edge of said guard members;
  means for slidably connecting said second guard member to said second pivot point to permit said first and second guard members to pivot as a unit about said first pivot point upon movement of a workpiece into engagement with said inner edge of said second guard member; and
  means for slidably connecting said first guard member to said first pivot point to permit said first and second guard members to pivot as a unit about said second pivot point.

10. A lower saw guard assembly for a radial saw including a rotary saw blade, comprising:
  first and second guard plates substantially in the shape of quadrants, each guard plate having a straight horizontal edge, a straight vertical edge, and an arcuate outer edge;
  said guard plates normally overlapping each other along said vertical edges to provide an overlap area and to establish a substantially semi-circular lower guard for the radial saw with said arcuate edges of said guard plates encircling the lower periphery of the saw blade;
  said first guard plate being mounted for pivotal movement about a firat pivot point located adjacent to its horizontal edge and its arcuate edge;
  said second guard plate being mounted for pivotal movement about a second pivot point located adjacent to its horizontal edge and its arcuate edge;
  a pin and slot connection for slidably connecting said guard plates together to permit said guard plates to pivot simultaneously in opposite directions about said first and second pivot points upon movement of a workpiece into engagement with either arcuate edge of said guard plates;
  said second guard plate including an elongated arcuate slot extending from said second pivot point toward its vertical edge to permit said first and second guard plates to pivot as a unit about said first pivot point upon movement of the workpiece into engagement with said vertical edge of said second guard plate; and
  said first guard plate including an elongated arcuate slot extending from said first pivot point toward its vertical edge to permit said first and second guard plates to pivot as a unit about said second pivot point.

* * * * *

UNITED STATES PATENT OFFICE
CERTIFICATE OF CORRECTION

Page 1 of 2

Patent No. 3,913,437    Dated October 21, 1975

Inventor(s) Howard David Speer and Burton Elwood Gerke, Jr.

It is certified that error appears in the above-identified patent and that said Letters Patent are hereby corrected as shown below:

Column 2, line 3, after "Each" insert --saw--.

line 24, after "guard" insert --members--.

Column 4, line 12, the word "a" second occurrence should be --is--.

Column 6, line 7, after "guard" insert --plate--.

Column 9, line 17, "32" should be --34--.

Column 10, line 10, "32" should be --34--.

line 21, the word "durning" should be --during--.

line 37, after "guard" insert --saw--.

Column 11, line 48, after "pivot" insert --point--.

UNITED STATES PATENT OFFICE
CERTIFICATE OF CORRECTION

Patent No. 3,913,437   Dated October 21, 1975

Inventor(s) Howard David Speer and Burton Elwood Gerke, Jr.

It is certified that error appears in the above-identified patent and that said Letters Patent are hereby corrected as shown below:

Column 12, line 12, after "guard" insert --plate--.

Column 14, line 38, "firat" should be --first--.

Signed and Sealed this

Twenty-first Day of March 1978

[SEAL]

Attest:

RUTH C. MASON
Attesting Officer

LUTRELLE F. PARKER
Acting Commissioner of Patents and Trademarks